(12) United States Patent
Kjell et al.

(10) Patent No.: US 7,369,931 B2
(45) Date of Patent: May 6, 2008

(54) GEAR SHIFT PREVENTION

(75) Inventors: Anders Kjell, Stockholm (SE); Johnny Rickman, Sodertalje (SE)

(73) Assignee: Scania CV AB (publ) (SE)

( * ) Notice: Subject to any disclaimer, the term of this patent is extended or adjusted under 35 U.S.C. 154(b) by 288 days.

(21) Appl. No.: 11/087,450

(22) Filed: Mar. 23, 2005

(65) Prior Publication Data
US 2005/0216166 A1   Sep. 29, 2005

(30) Foreign Application Priority Data
Mar. 23, 2004   (SE) ................................. 0400745

(51) Int. Cl.
*B60K 28/16*   (2006.01)
(52) U.S. Cl. ........................ 701/87; 180/337
(58) Field of Classification Search ............... 701/87, 701/51, 53, 82, 88; 477/34, 125; 180/337, 180/338, 345
See application file for complete search history.

(56) References Cited

U.S. PATENT DOCUMENTS

| | | | | |
|---|---|---|---|---|
| 4,788,892 A | * | 12/1988 | Komoda et al. | 477/120 |
| 6,490,516 B1 | * | 12/2002 | Henneken et al. | 701/51 |
| 2005/0114003 A1 | * | 5/2005 | Baize | 701/65 |

* cited by examiner

*Primary Examiner*—Dalena Tran
(74) *Attorney, Agent, or Firm*—Ostrolenk, Faber, Gerb & Soffen, LLP

(57) ABSTRACT

A method for temporarily preventing automatic gear shifting in a vehicle, comprising the steps of: preventing gear shifting as long as a traction control system indicates that at least one driven wheel is spinning, calculating a vehicle acceleration, calculating a value of a derivative of the acceleration or a value indicative of a difference between the vehicle acceleration and a previously calculated vehicle acceleration, and preventing gear shifting for a predetermined time, if the value is equal or higher than a predetermined value. A system, a computer program, a computer program product and an electronic control unit for performing the method are also disclosed.

14 Claims, 3 Drawing Sheets

GEAR SHIFT PREVENTION

TECHNICAL FIELD OF THE INVENTION

The present invention relates to a method for temporarily preventing gear shifting in a vehicle. The invention also relates to a system, a computer program, a computer program product and an electronic control unit for performing the method.

BACKGROUND OF THE INVENTION

An automatic gearbox for a vehicle is typically controlled by a gearbox ECU (Electronic Control Unit), which controls gear selection so as to achieve an engine operation considered appropriate. A set of parameters and indicators may be considered when determining an initiation of a gear change. Such a set typically comprises the vehicle speed and an indication of whether a TCS (Traction Control System) is activated or not. The TCS typically comprises wheel-speed sensors and an ABS (Antilock braking system)/TCS-ECU. The ABS/TCS-ECU inter alia controls the wheel brake for a driven wheel which shows a tendency to spin and/or adapts the engine torque to a drive torque which can be transferred to the road, so that the vehicle retains its stability.

Especially when driving uphill on a smooth or slippery road or when cornering, the driven wheels may spin. The TCS is therefore activated and a message is sent to the gearbox ECU from the ABS/TCS-ECU that the TCS is activated. If the gearbox ECU detects that the TCS is activated, a gear change, such as an undesired upshift when driving uphill, is prevented in order to not cause inconvenience for the driver as well as disturbing queues of other vehicles behind the vehicle. This is especially true if the vehicle is heavy, such as a truck or a bus, which generally has a longer acceleration time than an ordinary car. U.S. Pat. No. 6,490,516-B1 discloses a method wherein an electronic gear control receives signals from a TCS.

Unfortunately, sometimes an undesired gear change is initiated anyway although one of the driven wheels has started to spin. The reason for this may be that the TCS is slow and the message informing that the TCS is activated arrives too late to the gearbox ECU.

SUMMARY OF THE INVENTION

The object of the present invention is to improve an automatic or semi-automatic gear shifting system in such a way that it prevents or at least decreases the number of undersired gear changes when a driven wheel is spinning.

The invention relates to a method for temporarily preventing automatic gear shifting in a vehicle, comprising the steps of:

preventing gear shifting as long as a traction control system indicates that at least one driven wheel is spinning,
calculating a vehicle acceleration,
calculating a value of a derivative of the acceleration or a value indicative of a difference between the vehicle acceleration and a previously calculated vehicle acceleration, and
preventing gear shifting for a predetermined time, if the value is equal or higher than a predetermined value.

Hereby is achieved that an incipient wheel spin for a driven wheel may be predicted before the traction control system detects that it has happened and that a gear change may be prevented even before a traction control system has been activated and communicated this to the means for controlling the gear shifting.

In one embodiment the calculation of the vehicle acceleration is based on a value indicative of the instantaneous vehicle speed and a previously calculated vehicle speed.

The invention also relates to a semi-automatic or automatic gear shifting system for a vehicle, comprising an electronic control unit adapted for controlling a gear shift in a gearbox and preventing gear shifting as long as a traction control system indicates that at least one driven wheel is spinning and a calculating apparatus adapted to calculate a vehicle acceleration, the calculating apparatus being adapted to calculate a value of a derivative of the acceleration or a value indicative of a difference between the vehicle acceleration and a previously calculated vehicle acceleration, and a gear shift prevention device operable to prevent gear shifting for a predetermined time, if the value indicative of the acceleration difference is equal or higher than a predetermined value or if the traction control value indicates that at least one driven wheel is spinning.

Furthermore the invention relates to a computer program and a computer program product for temporarily preventing automatic gear shifting in a vehicle, comprising computer readable code means, which when run on an electronic control unit in a vehicle comprising a speed sensor, a traction control system and an automatic gear shifting system, causes the electronic control unit to perform the method. The computer program product, comprises a computer useable medium and the computer program according, the computer program being recorded on the computer useable medium.

Moreover the invention relates to an electronic control unit, comprising a storing means and the computer program, the computer program being stored on the storing means.

In one embodiment the electronic control unit is adapted for controlling automatic gear shifting in a vehicle and to communicate with a traction control system.

Other features and advantages of the present invention will become apparent from the following description of the invention which refers to the accompanying drawings.

BRIEF DESCRIPTION OF THE DRAWINGS

The objects, advantages and effects as well as features of the present invention will be more readily understood from the following detailed description of a method, system and computer program, as well as other embodiments, when read together with the accompanying drawings, in which.

DETAILED DESCRIPTION OF THE INVENTION

Figure 1:
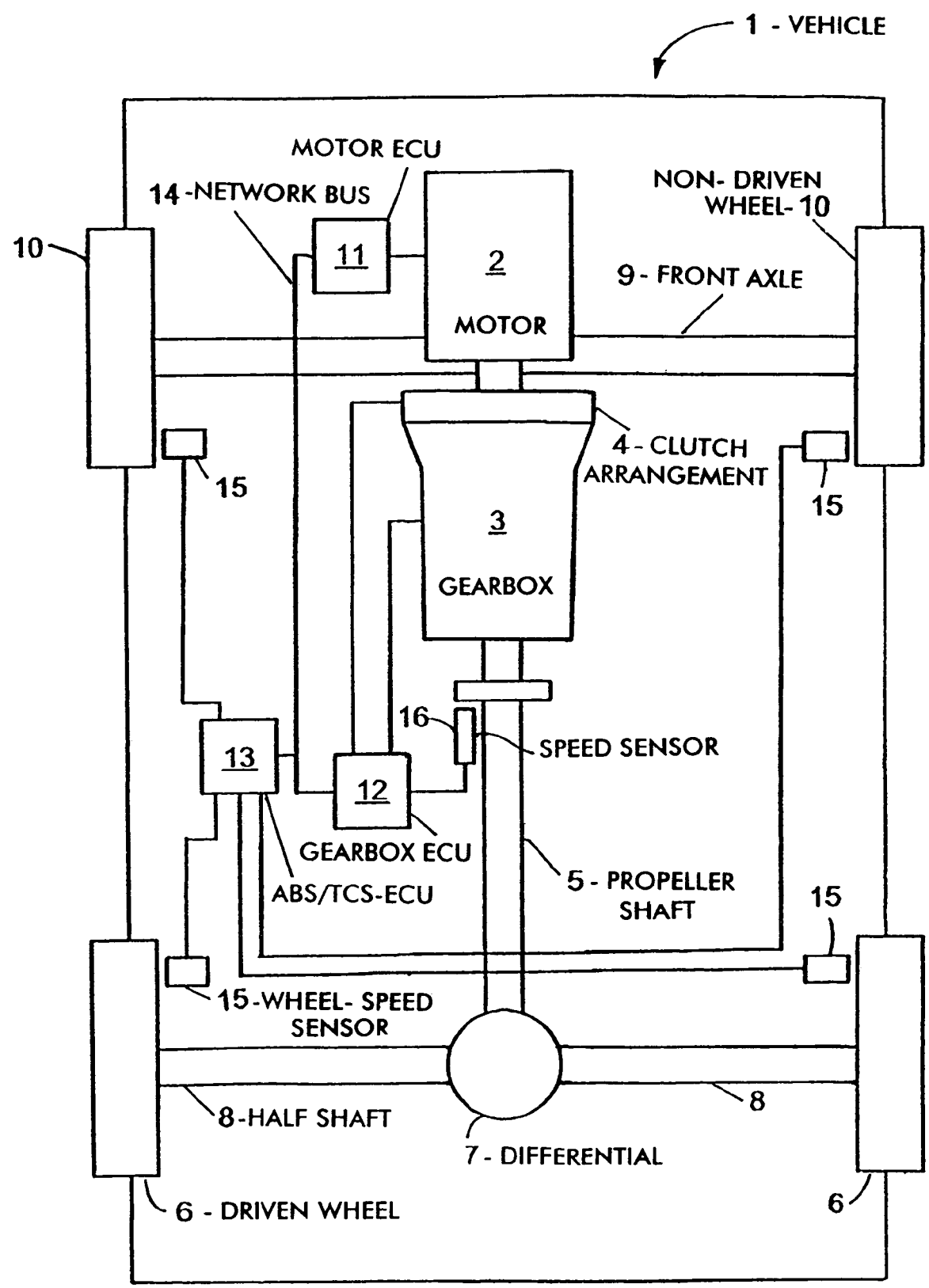
FIG. 1 schematically shows a vehicle according to the invention.

While the invention covers various modifications and alternative constructions, preferred embodiments of the invention are shown in the drawings and will hereinafter be described in detail. However, it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims to the full range of their equivalents.

FIG. 1 shows a schematic block diagram of a vehicle 1, such as a bus and a truck, comprising a motor 2 for propelling the vehicle, such as an internal combustion engine, a hybrid motor and an electric motor. The motor 2 is connected to an input shaft for a gearbox 3 via a clutch arrangement 4. A motor torque is thus transmitted to a propeller shaft 5 via the gearbox 3 and the propeller shaft 5 further transmits the motor torque to rear, driven wheels 6 via a differential 7 and corresponding half shafts 8. The vehicle 1 also comprises at least one front axle 9 with at least two non-driven wheels 10. A motor ECU 11 is arranged for controlling the motor 2, a gearbox ECU 12 is arranged for controlling inter alia the clutch arrangement 4 and the gearbox 3 and an ABS/TCS-ECU 13 is arranged for controlling the wheel brakes (not shown) for each one of the driven wheels 6 and non-driven wheels 10. The motor ECU 11, the ABS/TCS-ECU 13 and the gearbox ECU 12 are able to communicate with each other via a vehicle internal network bus 14, e.g. a bus compatible with CAN (Controller Area Network), TTCAN (Time-triggered Controller Area Network) and/or FlexRay. The ABS/TCS-ECU 13 belongs to an ABS and a TCS, wherein the TCS can be said to be an extension of the ABS in the sense that the TCS also utilizes the same hardware as the ABS: wheel-speed sensors 15 for each one of the wheels, the wheel brakes (not shown) and an hydraulic modulator (not shown) located between the ABS/TCS-ECU 13 and the wheel brakes respectively. Specific examples of the hardware and software of the ABS and TCS as well as their functions are known to a person skilled in the art and are therefore not described more in detail. It must however be understood that the invention also covers embodiments where the TCS computer program is comprised in another ECU than the ECU wherein the ABS computer program is executed and embodiments where there is no ABS computer program present.

At least one speed sensor 16 for sensing the speed of rotation of the propeller shaft 5 is in this embodiment connected to the gearbox ECU 12. A purpose of the speed sensor 16 is to receive a value used by the gearbox ECU 12 to calculate a vehicle speed. The vehicle speed is then used as an input parameter in a calculation to determine if an automatic gear change shall be initiated by the gearbox ECU 12. Different calculation methods involving the vehicle speed for determining if an automatic gear change shall be initiated are known to a person skilled in the art and are not as such part of this invention. Such calculation methods are therefore not described more in detail. The speed sensor 16 may of course be connected to another ECU than the gearbox ECU 12 as long as the gearbox ECU 12 is able to retrieve the value, e.g. via the vehicle internal network bus 14. The calculation of the vehicle speed is according to the invention also not limited to be processed by the gearbox ECU 12, but may be processed by another ECU, such as the ABS/TCS-ECU 13, directly or indirectly connected to the vehicle internal network bus 14. Although not shown in any drawings, instead of arranging the speed sensor 16 adjacent to the propeller shaft 5, the speed sensor may be positioned for sensing the speed of rotation of a fly wheel, a crankshaft, an apparatus driven by the motor 2, such as an alternator, and/or the input shaft for the gearbox. A calculation of the vehicle speed based on the speed of rotation for these three elements are similar to the calculation based on the speed of rotation of the propeller shaft 5 and is known to a person skilled in the art.

Although not shown in FIG. 1 other alternatives for retrieving values relating to the vehicle speed may be utilised according to the invention, e.g. by retrieving a value of the vehicle speed from a positioning system, such as a GPS (Global Positioning System), a differential GPS, Orbcomm, Gallileo and Glonas, or a vehicle radar system and/or by retrieving a value of the rate of rotation of the driven or non-driven wheels from the ABS/TCS ECU.

Figure 2:
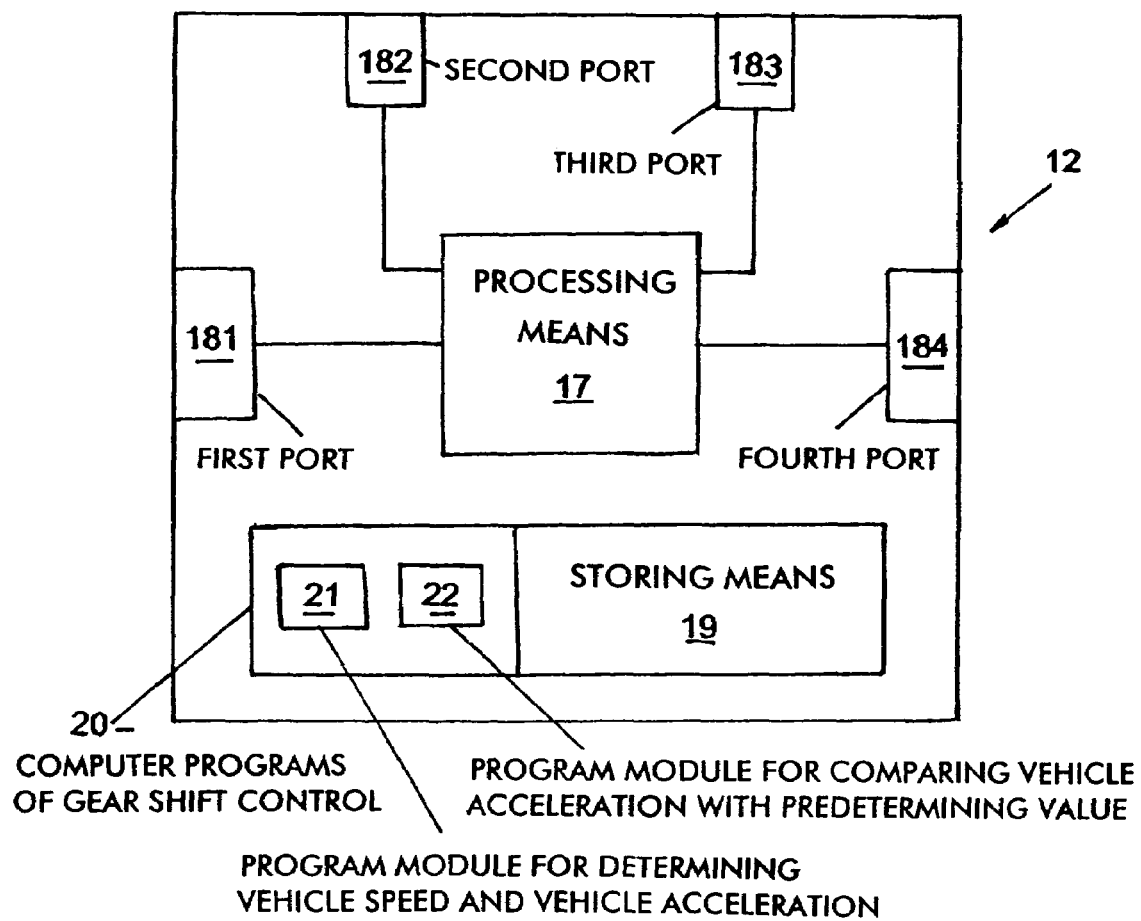
FIG. 2 schematically shows an ECU according to the invention.

An example of an ECU according to the invention, in this embodiment the gearbox ECU 12, is schematically disclosed in FIG. 2. The gearbox ECU 12 here comprises a processing means 17 connected to a first port 181 in order to enable communication with other ECUs, such as the ABS/TCS-ECU 13 via the vehicle internal network bus 14, a second port 182 for communications, either directly or indirectly via a special clutch ECU (not shown) with actuator means (not shown) for the clutch arrangement 4, a third port 183 for communication with actuator means (not shown) for the gearbox 3, and a fourth port 184 for receiving signals from the speed sensor 16. The processing means is also connected to at least one computer program product in the form of storing means 19, such as a hard disk, a flash memory, a ROM (Read-only memory), an EPROM (Erasable Programmable ROM) or an EEPROM (Electrically Erasable Programmable ROM). The storing means in this embodiment comprises inter alia a computer program 20 for gear shift control. This computer program 20 comprises determining means in the form of a program module 21 for determining a vehicle speed and vehicle acceleration and comparing means in the form of a program module 22 for comparing the vehicle acceleration with a predetermined value.

Figure 3:
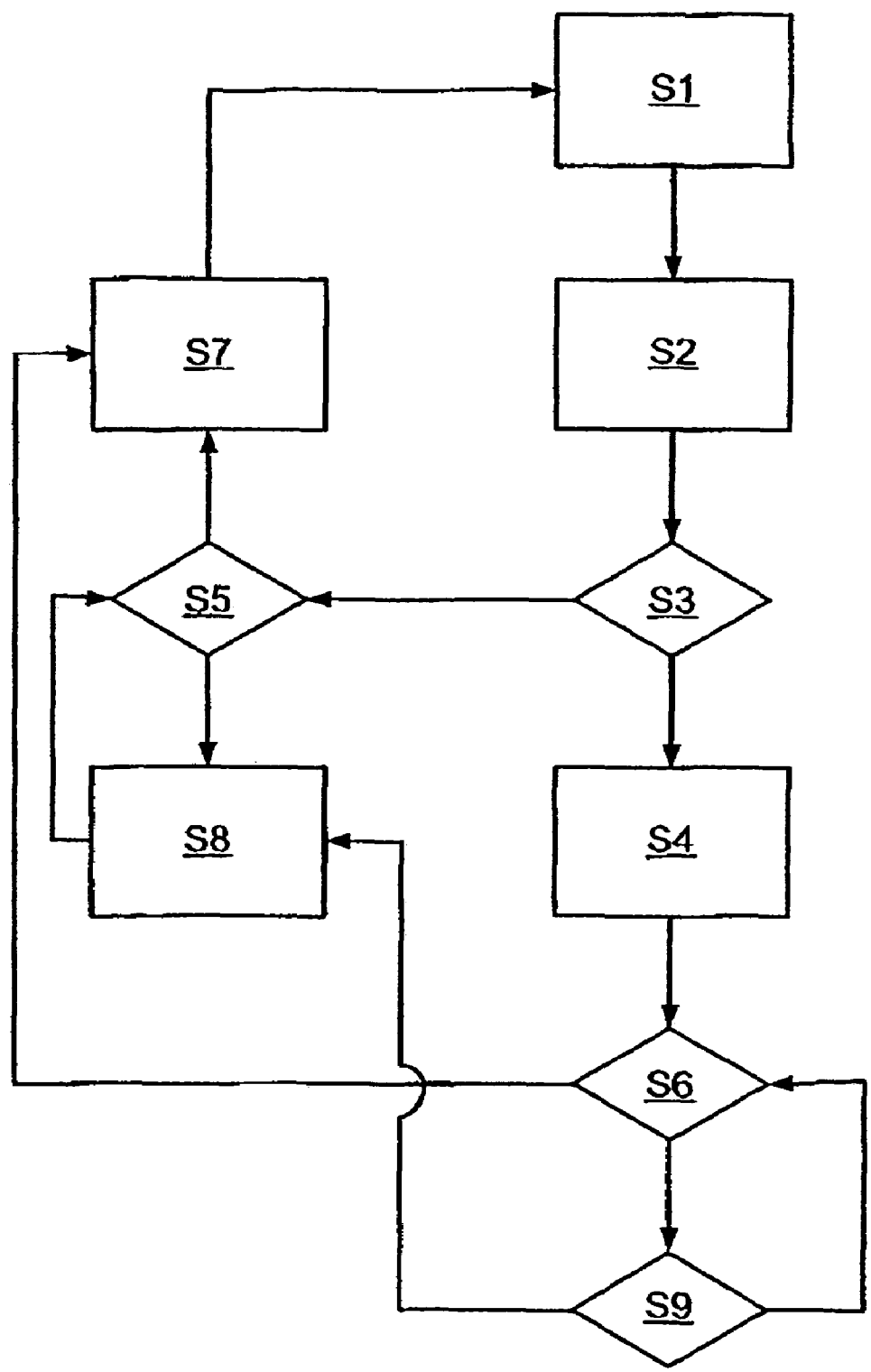
FIG. 3 is a flow diagram of an embodiment of a method according to the invention.

Having described embodiments of a system and a vehicle, some embodiments of a method according to the invention will now be described in conjunction with FIG. 3. In a first step S1 a speed signal $V_n$ from e.g. the speed sensor 16 is received by the gearbox ECU 12 and a vehicle speed $V_n$ as well as a vehicle acceleration An is calculated by the gearbox ECU 12 through the computer program 20 based on the received speed signal and a previous speed signal corresponding to a previous speed $V_{n-1}$, e.g. through $A_n=(V_n-V_{n-1})/\Delta t$, where $\Delta t$ is a predetermined estimation of the time difference between when the speed $V_n$ and the previously calculated speed $V_{n-1}$ were calculated. Other methods for calculating/estimating the vehicle acceleration known to a person skilled in the art may however be used instead of or in addition to the calculation described above.

In a second step S2, a value $A_D$ based on the vehicle acceleration calculated in step S1 and a previously calculated vehicle acceleration $A_{n-1}$ calculated in a foregoing iteration of step S1, i.e. if step S1 was performed for the n:th time, the previously calculated vehicle acceleration may be, but does not have to be, the acceleration calculated in step S1 during the n−1 time step S1 was performed. The value $A_D$ may be the difference between the vehicle acceleration $A_n$ and the previously calculated vehicle acceleration $A_{n-1}$, i.e. $A_D=A_n-A_{n-1}$ or $A_{n-1}-A_n$. Alternatively, the value $A_D$ may be calculated as a derivative of the vehicle acceleration, e.g. $A_D=(A_n-A_{n-1})/\Delta t$, where $\Delta t$ is e.g. a predetermined estimation of the time difference between when the vehicle acceleration $A_n$ and the previously calculated vehicle acceleration $A_{n-1}$ were calculated.

In a third step S3, the value $A_D$ is compared with a predetermined value. In this embodiment the predetermined value is set as a limit when the driven wheels are likely to spin in the near future. This predetermined value may be empirically chosen or calculated through any theory known in the art. In the embodiment where the value $A_D=A_n-A_{n-1}$ and the value $A_D$ is larger than the predetermined value, the driven wheels are considered likely to spin in the near future and the method continues with a fourth step S4. Due to this step S3 a predetection of wheel spin is possible even before the wheel slip has become so large that the TCS is activated to control the wheel brakes of the driven wheels. If the value $A_D$ is smaller than the predetermined value the wheels are not considered as likely to spin in the near future and the method continues with a fifth step S5.

In step S4, the computer program 20 causes the gearbox ECU 12 to enter a mode in which gear shifting is prevented for a predetermined time. The predetermined time is set as a time in which a possible message, such as a TCS indicator in a CAN-message, from the ABS/TCS-ECU 13 that the TCS is activated must have been received if the TCS have been activated due to a wheel slip having been indicated/forseen in step S3. After step S4, the method continues with a sixth step S6. Alternatively the predetermined time may be dependent on the value $A_D$, such that a large value causes a relatively long predetermined time and a small value causes a relatively short predetermined time or vice versa.

In step S5 it is determined if the TCS is activated by e.g. checking the TCS indicator in a latest message from the ABS/TCS-ECU 13. If the TCS indicator shows that the TCS is not activated the method continues with a seventh step S7, else the method continues with an eighth step S8.

In step S6 it is determined if the predetermined time has been reached. If the answer is 'yes', i.e. the predetermined time has been reached, the method continues with step S7. If the answer is 'no', the method continues with a ninth step S9.

In step S7 the gearbox ECU 12 determines that the gear shifting is not prevented due to spinning driven wheels, since no indication that the TCS is currently activated has been received by from the ABS/TCS-ECU 13. Initiation of a gear change may of course be prevented due to other circumstances and criteria known in the art, such as criteria directly dependent on vehicle speed, distance travelled after the TCS has been deactivated and a current gear, but such criteria and circumstances do not as such belong to this invention and are therefore not described in detail. After step S7 the method returns to step S1.

In step S8 gear shifting is prevented, e.g. by indicating prevention through an indicator checked by a gear shifting criteria checking module of the computer program 20. Another way of preventing gear shifting is to temporarily and drastically raise the values for the engine speed intervals for each gear, so that an engine speed that normally is considered as too high for a certain gear temporarily is considered as suitable for that gear and therefore no gear shift is initiated. After step S8 the method returns/continues to step S5.

Step S9 is similar to step S5, i.e. it is determined if the TCS is activated by checking the TCS indicator in a latest message from the ABS/TCS-ECU 13. If the TCS indicator shows that the TCS is not activated the method returns to step S6, else the method continues with step S8.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for temporarily preventing automatic gear shifting in a vehicle, comprising the steps of:
    preventing gear shifting as long as a traction control system indicates that at least one driven wheel is spinning and is not providing a sufficient degree of traction of the driven wheel;
    calculating acceleration of the vehicle;
    calculating as a first value a derivative of the acceleration or a value indicative of a difference between the vehicle acceleration and a previously calculated vehicle acceleration; and
    preventing the gear shifting for a predetermined period of time, if the first value is equal to or higher than a predetermined value.

2. The method according to claim 1, wherein the calculation of the vehicle acceleration is based on the instantaneous vehicle speed and a previously calculated vehicle speed.

3. The method according to claim 1, wherein the predetermined value is selected so, that below the predetermined value, the at least one driven wheel is unlikely to be spinning.

4. The method of claim 1, wherein a length of the predetermined period of time is previously set such that during the predetermined period of time a signal indicating that a traction control system is activated is received by the gearbox electronic control system from the traction control system.

5. The method of claim 1, wherein the predetermined period of time is selected from a set of predetermined time period values such that when $A_D$ increases a larger predetermined time period value is selected from the set of predetermined time period values as the predetermined period of time.

6. A semi-automatic or automatic gear shifting system for a vehicle, comprising:
    an electronic control unit operable to control a gear shift in a gearbox and to prevent gear shifting as long as a traction control system indicates that at least one driven wheel is spinning;
    a calculating apparatus operable to calculate acceleration of the vehicle, the calculating apparatus also being operable to calculate as a first value a derivative of the acceleration or a value indicative of a difference between the vehicle acceleration and a previously calculated vehicle acceleration; and
    a gear shift prevention device operable to prevent gear shifting for a predetermined period of time, if the first value is equal to or higher than a predetermined value.

7. The gear shifting system for a vehicle according to claim 6, wherein the predetermined value is selected so that, below the predetermined value, the at least one driven wheel is unlikely to be spinning.

8. The method of claim 6, wherein a length of the predetermined period of time is previously set such that during the predetermined period of time a signal indicating that a traction control system is activated is received by the gearbox electronic control system from the traction control system.

9. The method of claim 6, wherein the predetermined period of time is selected from a set of predetermined time period values such that when $A_D$ increases a larger predetermined time period value is selected from the set of predetermined time period values as the predetermined period of time.

10. A computer-readable medium incorporating a program of instructions operable to run an electronic control unit in a vehicle, the program operable for temporarily preventing automatic gear shifting in a the vehicle, the program comprising:
- instruction for calculating acceleration of the vehicle;
- instruction for calculating as a first value a derivative of the acceleration or a value indicative of a difference between the vehicle acceleration and a previously calculated vehicle acceleration; and
- instruction for preventing the gear shifting for a predetermined period of time, if the first value is equal to or higher than a predetermined value.

11. The electronic control unit, comprising a storing unit including the computer-readable medium according to claim 10.

12. The electronic control unit according to claim 11, wherein the electronic control unit is operable to control automatic gear shifting in a vehicle and to communicate with a traction control system.

13. The method of claim 10, wherein a length of the predetermined period of time is previously set such that during the predetermined period of time a signal indicating that a traction control system is activated is received by the gearbox electronic control system from the traction control system.

14. The method of claim 10, wherein the predetermined period of time is selected from a set of predetermined time period values such that when $A_D$ increases a larger predetermined time period value is selected from the set of predetermined time period values as the predetermined period of time.

* * * * *